(12) United States Patent
Genevrino

(10) Patent No.: US 6,261,451 B1
(45) Date of Patent: Jul. 17, 2001

(54) OIL SLICK REMOVAL/RECOVERY APPARATUS

(76) Inventor: Louis Genevrino, 4525 Lemp Ave., North Hollywood, CA (US) 91602

( * ) Notice: Subject to any disclaimer, the term of this patent is extended or adjusted under 35 U.S.C. 154(b) by 0 days.

(21) Appl. No.: 09/274,004

(22) Filed: Mar. 22, 1999

(51) Int. Cl.$^7$ ...................................................... E02B 15/04
(52) U.S. Cl. ........................ 210/236; 210/242.3; 210/923
(58) Field of Search ................................. 210/242.3, 923, 210/170, 747, 236, 776

(56) References Cited

U.S. PATENT DOCUMENTS

| | | | |
|---|---|---|---|
| 3,700,107 | * | 10/1972 | Flaviani .............................. 210/242.3 |
| 3,968,041 | * | 7/1976 | De Voss ............................. 210/242.3 |
| 4,116,833 | * | 9/1978 | Stagemeyer et al. ............. 210/242.3 |
| 4,315,818 | * | 2/1982 | Thomas .............................. 210/242.3 |
| 5,030,363 | * | 7/1991 | Pole .................................... 210/242.3 |
| 5,043,064 | * | 8/1991 | Abell et al. ........................ 210/242.3 |

* cited by examiner

*Primary Examiner*—Duane Smith
*Assistant Examiner*—Frank M. Lawrence
(74) *Attorney, Agent, or Firm*—Frank L. Zugglter

(57) ABSTRACT

An apparatus (15) mounted to a boat structure (17) for skimming a layer (65) of oil in an oil slick (26) deposited on water (29) and by which the boat structure (17) freely sinks or rises during such skimming regardless of the weight of accumulated oil (71) that is reclaimed and recovered in or removed from its hold (67). A drum (23) with a plastic liner (25) having an adherence characteristic for oil is supported on its axle(s) (29) that is rotatable by means of a pulley belt system (41) and motor (55). Two (2) slots (31, 32) in inner panels (18, 19) for compartments (35, 36) in which the pivotable arms (37, 38) are disposed provide for connection between the drum's axle(s) (29) with the arms (37, 38). A structural arrangement (60) secured to each of the pivot arms (37, 38) extends across the compartmental structures (21, 22) and into the boat structure (17) and to which a skimming blade (64) is secured and placed in cooperative relation with the plastic liner (25) to skim oil from its slick (26). A guard (70) is disposed proximate to the rear edge (81) disposed proximate to the rear edge (81) of blade (64) to prevent flowing water (77) from being deposited with recovered oil (71) in a hold (67) of the boat structure (17).

21 Claims, 3 Drawing Sheets

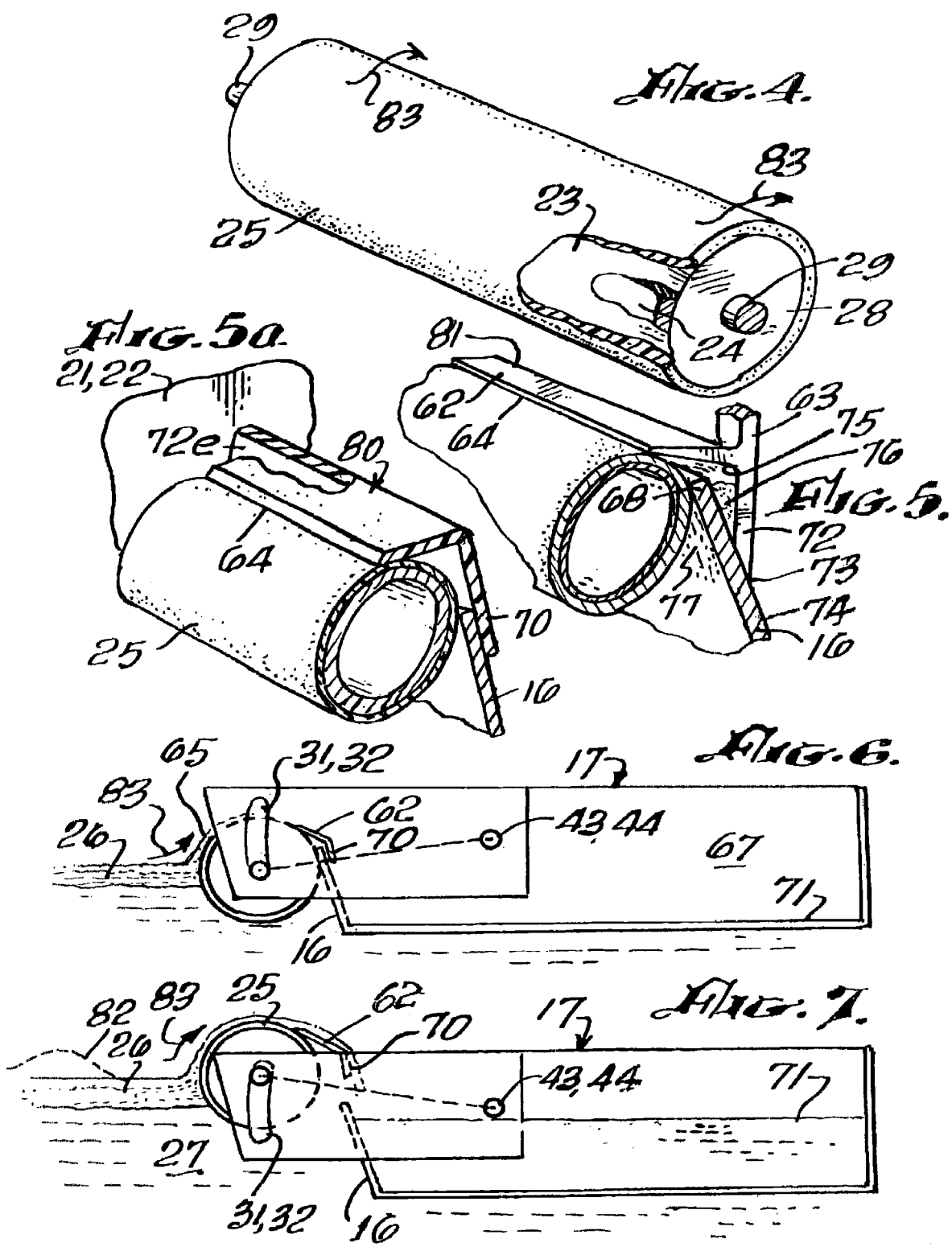

OIL SLICK REMOVAL/RECOVERY APPARATUS

TECHNICAL FIELD

This invention relates to the removal and recovery of oil from an oil spill in a body of water, such as in an ocean, sea, lake, river, gulf, or otherwise, and in particular, to an apparatus, its mounting on a boat structure, and the method, by which an oil slick in the form of a continuously moving or non-moving layer of oil in the body of water is collected and discharged into a hold of the boat structure.

BACKGROUND TO THE INVENTION

Since the advent of super tankers that haul an overwhelming volume of oil in the hold of each of them, frequent oil spillage therefrom has become an occurrence in and detriment to the environmental life of waters, sea creatures, and coastal like, as well as effecting economic loss fully or to some extent. Such an occurrence may occur on the high seas, along coast lines, or near or far from wharves at which crude or processed oil is delivered to or from a tanker. A good example is the relatively recent Exxon company's tanker oil loss along Alaskan shores, killing fish, birds, fowl, and perhaps other life forms, marine or otherwise, which strewed its beaches. In recent weeks, off the coast of the state of Oregon, U.S.A., an oil tanker was leaking, and was deliberately set on fire to consume its oil, rather than the oil permeating the water, etc., with a consequential loss of environmental like. Labor and costs also are involved in cleaning up the damage caused by these kinds of spills. Other examples in relatively recent times is spillage from oil tankers in the Persian Gulf and the North Sea areas.

Various apparata and methods in the past have been employed to rectify water and surrounding environmental conditions brought on by an oil spillage in the water. This invention discloses a unique and novel apparatus, its mounting to a boat structure, and a methods, all of which is deployed in a body of water, to remove an oil slick therein, giant or small in size, while collecting and reclaiming the oil spillage. The oil slick, in the form usually of a continuous and deepened layer is supported by a body of water on which it rides, as it is lighter than water. The apparatus collects the layer of oil from the oil slick and thereafter transfers it into a hold of the boat structure, or even to another structure. By operation of the invention, the oil spillage or slick continues to be reduced and/or eliminated and the adverse environmental condition brought on by the spill of oil into its body of water is abated in a addition to reserving the economic loss, to a greater or lesser extent, associated with the oil spill.

Prior art teachings of apparata heretofore known for recovering oil and the like are disclosed in U.S. Pat. Nos. 3,612,277; 3,685,653; 3,700,107; 3,905,902; 4,834,880; 4,557,832; 4,642,185; 5,051,181; 5,066,407; and 5,089,121.

SUMMARY OF THE INVENTION

The inventive concept is directed to a method and an apparatus incorporating a blade that includes a skimming edge co-operating with an endless plastic liner mounted on a rotatable drum and to which a layer of oil of an oil spillage or oil slick adheres, the method removing such layer of oil from the plastic liner and reclaiming it. As the drum rotates, the blade's one edge engages the liner to skim the layer, directing its flow along the width of the blade to gravitate or otherwise discharge into a hold of a gravitate or otherwise discharge into a hold of a boat structure, or other structure, on or with which the device or apparatus is mounted or cooperates. The drum, including an affixed axle or axles, and the skimming blade are supported in their respective assemblies by a pair of arms situated and pivotable in compartmental structures mounted to opposing bulkheads or panels in the boat or other structure. The recovered oil is retained in the hold, and subsequently made available for later processing for its intended use or processed for other uses or applications.

The drum and its liner are floatable in water, and is maintained at an efficient floating level for picking up a later of oil, regardless of the depth at which the boat or other structure drops (sinks) or rises, depending on whether weight of oil is accumulating in the hold, or weight of oil is substantially not much or not in the hold, or while the weight of oil is being transferred out of the hold. The drum's axle or axles are operatively connected to a pair of arms freely pivotable on their mounts in their corresponding compartmental structures, the axle(s) projecting through corresponding slots formed in the bulkheads (walls) or panels forming the compartmental structures. The axle(s) and drum thus are vertically shiftable or moveable by the elevating or lowering of the pivotable arms in the operation of the apparatus, while the boat either drops father into or rises up in the depth of a body of water, due to more or less reclaimed or recovered oil in the hold. In order to maintain operability of the apparatus, the drum and liner are maintained in a position to the water level at which the layer of oil is situated, and access of the axle(s) to the arms in the compartmental structures through the provision of slots accomplishes this. A motor is mounted on one of the arms adjacent a top opening for the one compartment structure, or elsewhere, and cooperates with a pulley belt system to deliver the motor's power to the drum's axle(s), thus rotating the drum and its liner. A structural formation, such as an elbow arrangement, mounted to each of the arms and over the top of the compartmental structures provides the support for the blade in its cooperation with an along the length of the drum. A guard is provided adjacent a terminus for a front bulkhead or panel, i.e., at a boat's bow, or at an entry point or line at which the layer of oil is transferred into the boat's hold, to prevent introduction of water into the hold with the separated oil.

An object of this invention is to provide a novel apparatus and method that separates a layer or depth of oil from a body of water.

An object of this invention is to provide for the cleaning up and the ridding of an oil slick from a body of water.

Another object of the invention is to unpollute the immediate and surrounding environment, water or otherwise, as soon as possible or practicable upon an oil spillage, say, from a tanker, or from an oil derrick positioned in a body of water, and out of which an oil slick of sufficient dimensions requiring its removal occurs.

A further object of the invention is to save fish, fowl, birds, and other living beings of marine and other natures.

Yet another object of this invention is to contribute to responsible environmental conduct and usage by cleaning up an oil slick in water, while reversing a disaster and an economic loss.

A further object of the invention is to initiate the process of reclaiming oil in a positive economic program, ultimately reducing or erasing monetary loss that would arise by the occurrence of the oil slick itself.

Still another object of the invention is to create a plastic liner on a rotatable drum and by which oil adheres as the drum rotates within an oil slick.

These and other objects and advantages of the invention will become more apparent by a full and complete reading of the following description, the appended claims thereto, and the accompanying drawing comprising three (3) sheets of eight (8) FIGURES.

BRIEF DESCRIPTION OF THE DRAWING

FIG. 4 is a perspective view, partially broken away, of a drum with axle(s) and which are part and parcel of the drum shown in FIGS. 1–3.

FIGS. 5 and 5a are fragmentary perspective views, of the apparatus of FIGS. 1–4, illustrating a co-operative relationship between a skimming blade and a guard to prevent water from accompanying oil from the rotating drum into the hold of a boat.

FIG. 6 is a side elevational diagrammatic view of the apparatus and the bow of a boat as the boat sets in a body of water with little or no oil in its hold.

FIG. 7 is a side elevational diagrammatic view of the apparatus and the bow of a boat that sets deeper in a body of water as a result of an accumulation of oil contained in its hold.

PREFERRED MODE OF CARRYING OUT THE INVENTION

Figure 1:
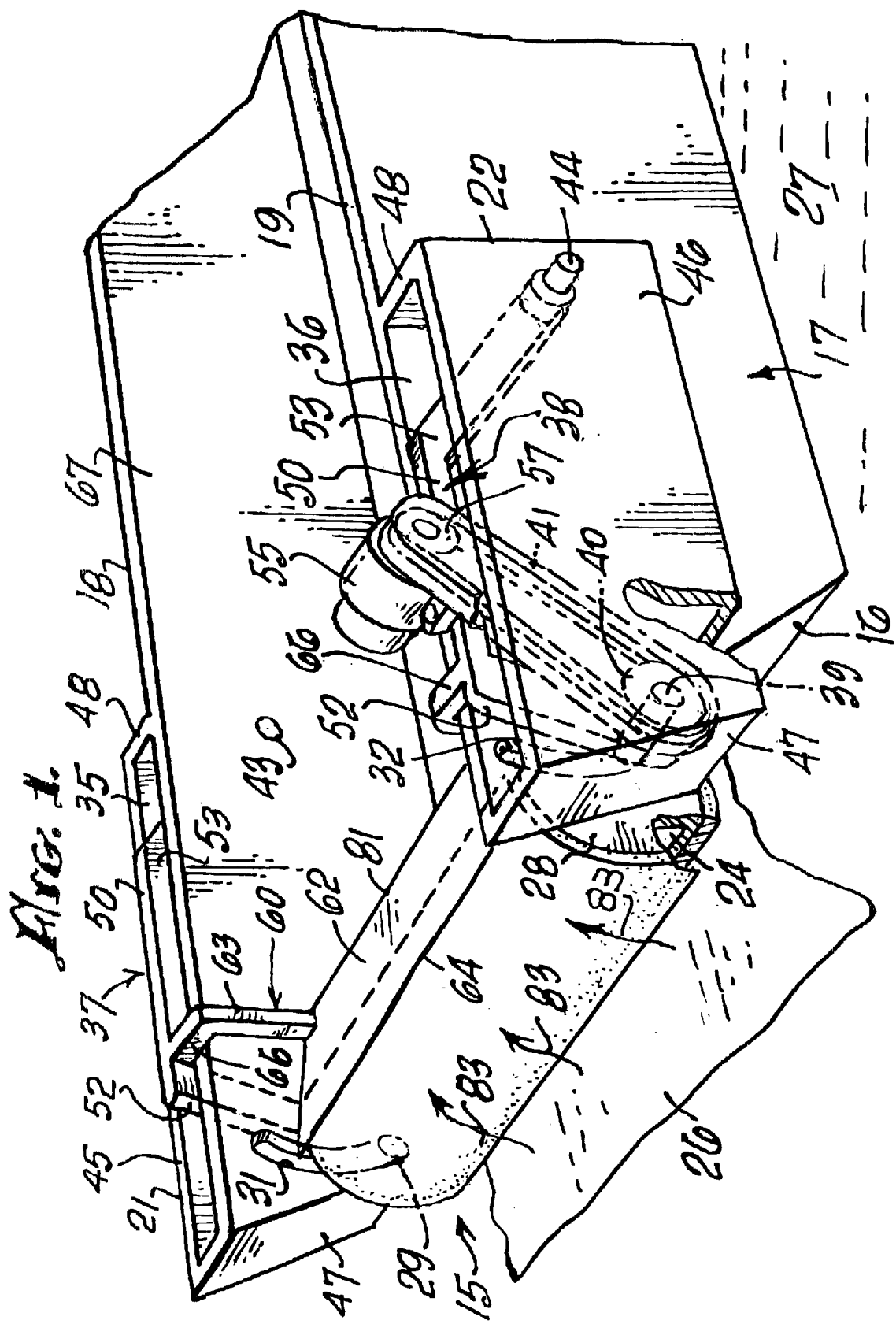
FIG. 1 is a perspective view of the apparatus of the invention, adaptable to a boat's bow, its extension, or elsewhere, of a boat.

Referring now to the drawing wherein reference characters therein correspond to like numerals hereinafter, an apparatus 15, FIG. 1, of the invention is shown to be disposed at a boat structure's end or bow 16, FIGS. 1, 3, of a boat structure 17, between a pair of its opposing or spaced bulkheads or panels 18, 19, to which a pair of compartmental structures 21, 22, respectively, are suitably securely mounted. Apparatus 15 comprises, FIGS. 1–4, a cylindrical drum 23, FIG. 4, hollow as at 24, and an endless circumferential lining or plastic liner 25 having a nature that includes an adherence characteristic for oil. Floatability of the drum 23 with lining 25 mounted on it is required in the operation of apparatus 15, and one way this is obtained is by the hollowness 24 of the drum 23 if not otherwise produced to provide such floatability. Lining or liner 25 is suitably affixed to the circumferential surface of drum 23, or integrally formed therewith, and in operation of apparatus 15 directly engages an oil slick 26 in a body of water 27, FIG. 3. The ends of the drum 23 are securely closed or sealed by suitable closure members 28, FIG. 4, that prevent ingress of water and/or oil into the hollowness 24 of drum 23. To each of the closure members 28, along the longitudinal axis for drum 23, an axle 29, FIGS. 1, 4, (or hilt, stem, shank, pin, shaft, stub, etc.) is suitably securely affixed so that axle 29 and drum 23 with its lining or plastic liner 25 rotate together.

Figure 2:
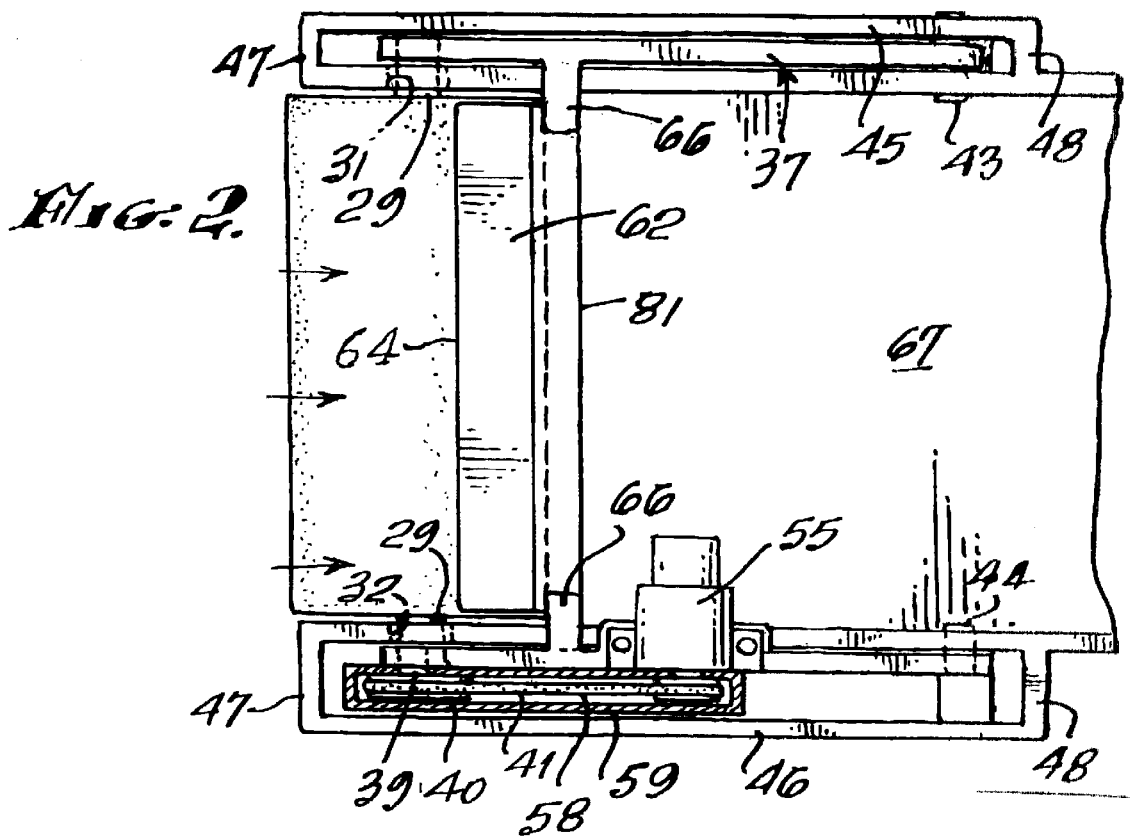
FIG. 2 is a plan view of the apparatus, partially in section, of the boat shown in FIG. 1.
Figure 3:
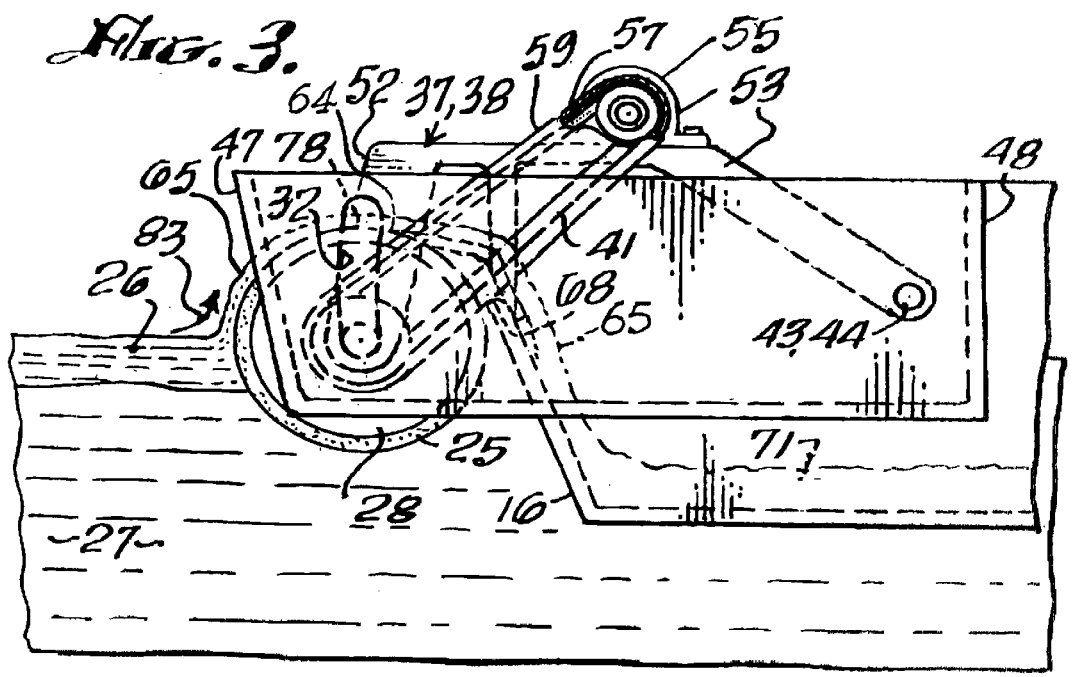
FIG. 3 is a side elevational view, partly in section, of the apparatus shown in FIGS. 1 and 2.

Each axle 29 (or a single one if it extends throughout the drum) extends from its corresponding closure member 28 to project through a corresponding slot formation 31, 32, FIGS. 1–3, respectively, illustrated in this embodiment of the invention as being circumferentially-formed in their corresponding bulkheads or panels 18, 19. Each bulkhead or panel 18, 19 also forms or includes an interiorly disposed panel for its corresponding compartmental structure 21, 22.

It is to be understood that the illustrative FIGURES do not limit construction of the compartmental structures 21, 22 to such illustration but that the construction of the compartmental structures may be fabricated in a different manner, such as, for example, having one or both interiorly disposed panel 18, 19 formed separately from their respective bulkheads in a boat structure, and then suitably attached thereto. In either case, slots 31, 32, whether circumferentially formed or otherwise, are provided through the bulkheads and/or panels 18, 19 for ingress of the axle(s) 29 into the respective compartments 35, 36 of their corresponding compartmental structures 21, 22.

Each of the axle(s) 29, in its corresponding compartment 35, 36, is suitably journaled for free rotation in a corresponding bore (not visible) of its corresponding one of a pair of generally aligned and spaced arms 37, 38 situation in its corresponding compartment 35, 36, journaled in and adjacent to the corresponding termini of such arms. The preferred circumferentially-formed slot formations 31, 32 accommodate a corresponding circumferential swing for axle(s) 29 and thus the drum 23 affixed thereto, as the boat structure 17 rises or drops during the drum's utilization. With respect to the one axle 29, in the forefront of FIG. 1, it projects through and past its pivot arm 38 in the form of an axle extension 39, so that a pulley wheel 40, part of a pulley belt system 41 for providing power to axle(s) and drum and being fixedly attached to such axle, provides or delivers power for rotation of the drum 23.

Each of the pair of pivot arms 37, 38 suitably and freely pivots about a fulcrum, distant from the axle(s) or drum 23, within a corresponding pin 43, 44, FIGS. 1–3, extending through, and adjacent to, the rearward terminus of their respective arms 37, 38. Each pin 43, 44 is securely suitable affixed to and between its corresponding bulkhead 18, 19 and to corresponding exteriorly disposed panels 45, 46 forming corresponding compartmental structures 21, 22.

Each compartmental structure 21, 22, with its corresponding compartments 35, 36 is further formed by forward and rear panels 47, 48 that are correspondingly connected to panels 45, 46. In the illustrated drawing, forward and rearward panels 47, 48 extend forwardly of bow 16, FIG. 1, and it should be understood that the forward and rear panels 47, 48 are not necessarily restricted to such forwardly illustrated locations.

Each pivot arm 37, 38 includes a shoulder segment 50 connecting together two (2) other arm segments 52, 53 to complete the formation of its corresponding pivot arm. In the illustrated embodiment, shoulder segment 50 of the one pivot arm 38 is disposed as at least as high as the open top for the compartment 36 in order that a motor 55 suitably securely mounts upon the shoulder segment 50. Motor 55 provides or delivers the necessary power for the pulley belt system 41 to rotate the drum 23. The pulley belt system 41 to rotate the drum 23. The system 41, FIG. 3, includes with its pulley wheel 40 a second pulley wheel 57 secured to the motor's shaft and a pulley belt 58, FIG. 2, extending between and mounted to the wheels 40, 57. The pulley belt system 41 is operative for any position of drum 23 and of axle(s) 29 in their slots 31, 32, by reason of its mounting on arm 38 that pivots in accordance with the floatable drum's position in the body of water 27. A suitable cover 59, FIG. 3, is mounted about the pulley belt system 41 to eliminate introduction of water thereto and its system components.

A structural arrangement 60, FIG. 1, here illustrated as an elbow formation, is mounted, preferably integrally formed, to the shoulder segment 50 of each pivot arm 37, 38, and by which a sliding or engaging relationship between a blade 62, FIGS. 1, 2, and the lining or liner 25 during the operation of apparatus 15 is maintained. The blade 62 is suitably securely mounted to and extends between a pair of longer legs 63 of structural formation 60, preferably at their bottoms. The blade 62, its length commensurate with the length of the drum 23, FIG. 2, includes a skimming edge 64 for skimming a layer 65 of oil, FIG. 3, from lining or liner 25, as drum 23 rotates in the operation of the apparatus. The abutting, engaging, or skimming relationship of the blade's edge 64 to the liner 25 provides for direction of the skimmed layer 65 of oil to flow over and across the width of the top of the blade 62 as drum 23 rotates into the blade's edge 64. A shorter leg 66 is included in each of the structural arrangements 60, preferably integrally therewith and with its corresponding longer leg 63, and extends across the top of each of its corresponding compartmental structures 21, to thereby connect its corresponding longer leg 63 to its corresponding shoulder segment 50.

Regardless of the change in depth of the boat structure 17 resulting from accumulation of or removal of oil from a hold 67 in the boat structure's, skimming edge 64 cooperates with the lining or plastic liner 25 for drawing off a layer 65 of oil adhering thereon, in the operation of the apparatus of the invention. The blade's edge 64 is disposed above a terminum 68, FIGS. 3, 5, on the bow 16, the terminus 68 constituting an entry line above which a skimmed layer 65, FIG. 3, of oil is caught by edge 64 to flow over the top of blade 62 and into the hold 67 of boat structure 17. As viewed in FIG. 3, the skimming edge 64 is disposed near or at the top of drum 23 irrespective of the drum's position in the body of water 27, although the edge 64 need not be always positioned near or at the top of drum 23, depending on the configuration and/or positioning or location of structural arrangement 60 for apparatus 15 and the boat structure 17.

A guard 70, FIGS 5, 5a, to prevent water from accompanying skimmed oil, or otherwise accumulating with skimmed oil in hold 67 as the latter accumulates oil 71, FIGS. 6, 7, therein, is suitably securely mounted to and extends across or between the longer legs 63 of their corresponding structural arrangements 60. As shown diagrammatically in FIG. 5, guard 70 is a depending partition 72 mounted to and extending between legs 63, with an edge 73 continually abutting the interior wall surface 74 of bow 16, regardless of its point or level of contact with such wall surface 74, to thereby provide for a bottom to a basin 75 formed by an angular inclination of partition 72 with the interior wall surface 74 and located below blade 62. Basin 75 collects some water deposits 76 of flowing water 77, FIG. 5, that may accompany, at the juncture of the blade's skimming edge 64 with liner 25 of drum 23, a moving head 78, FIG. 3, of a layer of oil 65 at such edge 64. Such water deposits 76 are retained in basin 75 until, in the operation of apparatus 15, the basin's dimension in the sinking of the boat as it is filling with oil 71 is minimized, as then most if not all of such water deposits 76 return with the remaining flowing water 77, FIG. 5, to the body of water 27 rather than into the hold 67.

FIG. 5a illustrates the construction of an extension 72e to partition 72, extending laterally to the walls forming compartmental structures 21, 22, i.e., outwardly of legs 63 (FIG. 5), in order that basin 75 is not incomplete between each leg 63 and its corresponding compartmental structure 21, 22. Were that to be so, water 77 could flow into hold 67. It should be understood that although FIGS. 5 and 5a are diagrammatically views of the assembly of the described elements to prevent water 77 from flowing into the hold 67, the construction of these elements in apparatus 15 follow state-of-the-art construction procedures in mounting them together. FIG. 5a further illustrates the utilization of a squeegee-type of construction 80 which integrates blade and guard together as a single constructed component (with or without connection to legs 63), and with the partition's extension 72e when desired or necessary.

It now should be apparent that regardless of the extent to which the boat structure 17 drops farther into the body of water 27 as the hold 67 accumulates oil 71, or rises by reason of a lesser or of a least amount of accumulated oil 71 in hold 67, guard 70 catches water deposits 76 accompanying the moving head 78 of oil as it flows off of the rotating drum, while the partition's extension 72e extending laterally to the walls forming compartmental structures 21, 22 prevent flowing water 77 from being introduced into hold 67 with oil. The partition 72 with its extension 72e in this illustrated embodiment is of a greater lateral dimension than the length of the drum 23. Guard 70 is positioned upon the legs 63 below the plane at which the skimming blade 62 is mounted to legs 63, and is suitably securely mounted to legs 63. Flexibility and a sufficient stiffness is the material of guard 70, such as, for example, hard rubber, is sought in order to maintain a constant engagement or abutment with the bow's interior wall 74 and the compartmental structures 21, 22 in the up-and-down motion of the legs 63 and the guard 70 in the operation of the invention.

FIG. 6 illustrates the boat structure 17 with an empty or almost empty hold 67 of recovered oil 71, the boat being at or near its highest level in the body of water, the axle(s) 29 of the floating drum 23 being at substantially its lowest point or plane in the blots 31, 32, while the pivot arms 37, 38 are at their lowest positions in their respective compartmental structures. Oil flows over the width of blade 62 and its rear edge 81 directly into the hold 67, while guard 70, if necessary or otherwise installed, eliminates flow 77 of water into hold 67.

As oil 71 accumulates in hold 67, its boat structure 17 sinks farther into the water's depth. As illustrated in FIG. 7, the entry line or terminum 68 on bow 16 approaches the level of the body of water 27, as hold 67 of the boat structure is at or is reaching a near or full capacity of accumulation of oil 71. At this point of depth for boat structure 17, when the entry line at the terminus 68 is approaching the level of the body of water 27, basin 75 assists in eliminating water flow 77 accompanying the moving head 78 of oil over the drum's lining 25 from joining the oil 71 in hold 67. FIG. 7 further illustrates hold 67 being substantially filled with recovered oil 71, wherein the floating drum's axle(s) 29 is at or near its highest point or plane in the slots 31, 32. It is to be noted from both FIGS. 6 and 7, that axle(s) 29, and thus rotatable drum 23, is substantially at the same position relative to the water level 27 regardless of the shallowness or depth of hold 67 or boat structure 17 within the body of water 27.

In operation, as the boat structure 17 is propelled through or otherwise stationarily positioned in the body of water 27, the oil slick 26, with or without assistance of the force of a wave 82, FIG. 7, is confronted by the lining or liner 25, FIGS. 2, 3. Motor 55 is operated in a customer mode to drive the pulley belt system 41, its pulley sheet 40 being affixed to the axle(s) 29 for drum 23, thereby rotating the drum 23 in the direction of arrows 83, FIGS. 3, 6, 7. A continuous layer 65 of oil adheres to the lining or plastic liner 25 during the rotation of drum 23, forming the moving head 78 for the layer 65 of oil in the direction of arrows 83. As drum 23 and lining 25 rotate, the moving head 78 likewise moves therealong, to be brought into physical contact with the skimming edge 64 of blade 62, across the latter's length and width. Head 78 is picked off or separated from the lining or liner 25, thereafter flowing over the blade's width to the blade's rear edge 81. Edge 81 is disposed beyond or past the entry line or terminum 69 of the boat structure 17. The moving head 78, as it flows past edge 81 discharges into or gravitates into hold 67, the moving head 78 becoming in actuality a beginning of an accumulation of reclaimed oil that is recovered from the oil slick 26.

As the weight of boat structure 17 increases or decreases, and thus its level in the body of water 27, due to the addition or depletion of oil 71 accumulating in or being subsequently withdrawn from hold 67, the drum's floating position to the level of the oil slick 26 is maintained by the pivotal action of arms 37, 38. These arms are free to pivot to the extent of the axial dimensions of slots 31, 32, while the drum and liner are free to shift in a vertical manner, to-and-fro, as the axle(s) 29 maneuver(s) back and forth along the axial or major dimensions of the slots. The structural arrangements 60 connecting the pivot arms 37, 38 to the skimming blade 62 assures effective skimming by the blade and its cooperative relationship to the drum's lining.

As bold 67 accumulates oil 71, should water deposits 76 collects in basis 75 during operation, they are returned to the body 27 of water as the guard's partition's edge 73 approaches the bow's terminus 68. Upon hold 67 being filled up to its maximum, or to the extent necessary whereby no more oil spillage is apparent, operation of apparatus 15 may be terminated and the reclaimed oil further processed in accordance with usual procedures therefor.

In assembly, fabrication of the individual components described above is first undertaken and completed to the point at which each is readily assembled to its adjacent component. It should be understood that the assembling of the aforesaid described elements of apparatus 15 need not be in the order of the following description. Closure members 28 are affixed to drum 23 and axle(s) 29 are affixed thereto, and lining or liner 25 suitable attached to the circumferential surface of the drum 23, if not integrally formed as a part thereof. Slots 31, 32 are formed in the forward portions of the opposing panels 18, 19 that may or may not already be assembled to the boat structure 17. Each of the pair of shoulder and arm-segment members, 50, 52, 53, each not necessarily integrally formed with one another, is positioned into place relative to their corresponding compartmental structures 21, 22. The axle(s) 29 are manipulated into their corresponding slots 31, 32 during the assembling of panels 18, 19 to the boat structure 17, and are thrust into bores (not visible) provided for them in their corresponding arm segments 52. After the axle extension 39 on the one axle 29 is thrust through its arm segment 52, the pulley wheel 40 is fixedly mounted thereto, and pulley belt 58 loosely applied to the pulley sheet 40, awaiting its fuller or operationally-completed mounting to pulley wheel 57. Pins 43, 44, with suitable bearings (not visible), are inserted through bores (not visible) provided in arm electrical leads (not shown), is securely mounted to segments 53 as they are mounted to their corresponding holes provided in the panels 18, 45 and 19, 46, respectively. Motor 55, with conventional its shoulder segment 50 and belt 58, already about wheel 40, then applied to pulley wheel 57 upon its fixation to the shaft of the motor 55. Blade 62 then is secured to the pair of depending longer legs 63 of the structural formation 60. The guard 70, with or without its extensions 72e, may be fabricated separately and then suitably securely mounted to the legs 63, or formed integrally with legs 63 or portions thereof.

The materials required for the boat structure 17 and the apparatus 15 are suitable chosen from known metals and other materials common to the boat and oil industries for the fabrication of the above described elements. Motor 55 and the components of pulley belt system 41 are of known types, to raise and lower arms and operate weighted components thereon. Rubber, and even plastic, are suitable materials out of which the guard 70 is made or fashioned for installation upon blade 62. The material forming the blade 62 also may be of the squeegee type of well-known material.

It is to be understood that suitable bearing means are or may be provided for the pivotal rotation of the corresponding one ends of the arms 31, 32 at which the fulcrums in pins 41, 42 are located, and for rotation of axle(s) 29 and drum 23 at the corresponding other ends.

Various changes and modifications may be made in the subject matter of the invention without varying from the scope and spirit of the appended claims. The drum 23 itself may be of a plastic material having an adherence characteristic for oil and of a weight floatable in water. The drum may be made from one or more materials which when assembled together to form the drum with its circumferential plastic liner is not heavier than the water that its size would displace, so that by its nature it remains floatable and subject to the action or movement of the pivot arms 37, 38. Although drum 23 is illustrated generally as being half in the body of water and half out of it, the invention comprehends an embodiment of a drum in the apparatus and/or boat structure that may be more out of the body of water or more in the body of water than what is illustrated herein. The legs 63 need not be positioned immediately adjacent their respective inner panels 18, 19, nor proximate to the forward arm segments 52 as illustrated. Compartmental structures 21, 22 need not be of top-open configurations as long as the structural formation 60 is operatively connected to the pivot arms and by which the boat structure 17 continues to freely sink or rise during a skimming operation, regardless of the weight of the hold's accumulating oil that is reclaimed and recovered in or withdrawn from the hold 67. Motor 55 may be mounted elsewhere than on shoulder segment 50, although the illustrated embodiment assures that drum and liner rotate regardless of any change in the boat structure's depth in the body of water due to increase or decrease of oil accumulation in its hold. The number of motors need not be limited to but one. Guard 70 and/or its extension 72e may not be included where water deposits 76 are not preventing oil only from substantially discharging into hold 68. The apparatus may be mounted to the stern, or along the length of a boat structure 17. The compartmental structures 21, 22 are illustrated as having portions forming their corresponding compartments 35, 36 disposed forwardly of its bow, however, depending upon the construction of the boat structure itself, the invention concept contemplates such structures being incorporated within or about the confines of a boat structure itself, with, if necessary, a panel or bulkhead being provided to effect an entry line for skimmed oil.

INDUSTRIAL APPLICABILITY

The invention is applicable in the oil industry, wherever an oil slick occurs in a body of water, and elsewhere where feasible.

I claim:

1. An apparatus for separating oil for recovery from an oil slick in a body of water comprising means pivotable about fulcrum means, blade means mounted to said pivotable means, drum means including lining means having an adherence characteristic for oil rotatably mounted to said pivotable means distant from such fulcrum means, means drum means of a weight floatable in water, said blade means in cooperative relationship with said lining means for skimming from a moving head of a layer of oil from the oil slick adhering to said lining means, as said drum means is caused to be be rotated against the moving head of the layer of oil, and means mounted to and extending between said pivotable means for preventing water from accumulating with the moving head of the skimmed layer of oil that is being discharged from said lining means as said drum means rotates, whereby reclaimable oil is recoverable from said drum means.

2. The apparatus of claim 1 including means for rotating said drum means.

3. The apparatus of claim 2 wherein said rotating means comprises a motor and a pulley belt system connecting the motor to the drum means.

4. The apparatus of claim 2 wherein said rotating means is mounted on said pivotable means and operatively connected to said drum means.

5. The apparatus of claim 4 wherein said rotating means comprises a motor and a pulley belt assembly connecting the motor to said drum means.

6. The apparatus of claim 1 or claim 2 or claim 3 or claim 4 or claim 5 wherein said lining means comprises plastic material.

7. The apparatus of claim 6 wherein said pivotable means includes legs to which said blade means is connected, said preventing means comprising a partition operatively connected to said legs, said partition depending from said legs to form a basin with a first wall of a structure to which said apparatus is mountable.

8. The apparatus of claim 1 wherein said pivotable means comprises spaced arm means and structural arrangement means mounted thereto, said blade means mounted to said structural arrangement means.

9. The apparatus of claim 8 wherein said structural arrangement means comprises leg means mounted to said arm means, said blade means mounted to said leg means.

10. The apparatus of claim 9 wherein said leg means comprises a first leg mounted to and extending inwardly from each said arm means and a second leg mounted to said first leg, said blade means mounted to and between each said second leg.

11. The apparatus of claim 8 including means mounted on at least one of said arm means for rotating said drum means.

12. The apparatus of claim 11 wherein said lining means comprises plastic material.

13. The apparatus of claim 12 including means mounted to said pivotable means for preventing water from accumulating with the moving head of the skimmed layer of oil being discharged from said lining means as said drum means rotates.

14. The apparatus of claim 13, wherein said preventing means comprises a partition operatively connected said pivotable means, said partition adapted to form a basin with a wall of a structure to which said apparatus is mounted.

15. In combination, a boat structure including a hold and spaced compartments with an apparatus for separating from a body of water oil in an oil slick and discharging a moving head of a layer of oil from the oil slick into said hold, comprising a pair of spaced aligned arm means each having a corresponding end pivotally mounted in a corresponding one of said compartments, drum means including axle means disposed between said compartments, said drum means of a weight floatable in water and including lining means having an adherence characteristic for oil, slot means communicating the compartments with said drum means, said axle means projecting through said slot means to rotatably connect with said arm means distant from the pivotal mounts for said arm means, and blade means mounted to and extending between said spaced arm means, said blade means in cooperative relationship with said lining means for skimming a moving head of the layer of oil adhering to it as said drum means is caused to be rotated against oil in the oil slick, whereby the layer of oil is recoverable from said drum means and discharged into the hold of the boat structure.

16. The apparatus of claim 15 including means for rotating said drum means connected to said axle means.

17. The apparatus of claim 15 or claim 16 including means mounted in proximate relation to said blade means for preventing water from being carried forward with a moving head of the layer of oil into the hold of the boat structure.

18. The apparatus of claim 17 wherein said preventing means comprises a partition.

19. The apparatus of claim 18 including leg means mounted to said arm means, said partition being mounted to said leg means.

20. The apparatus of claim 19 wherein said partition extends outwardly of said leg means to engage a wall of a compartmental structure to which said apparatus is mounted.

21. In a boat structure including a hold and a pair of spaced compartmental structures having corresponding compartments, this combination with a pair of spaced aligned arm means each pivotable about a fulcrum at their corresponding one ends their fulcrums being disposed in said corresponding compartments, each of said speaced compartmental structures including a slot that faces the slot in the other of said compartmental structures, drum means including a lining having an adherence characteristic to oil disposed between said compartmental structures and having axle means projecting through each said slot, said drum means disposed on said boat structure for direct engagement with an oil slick, said drum means of weight floatable on water, said axle means including an extension at one of its ends, said extension adapted for mounting thereto means for rotating said drum and axle means, and blade means operatively connected to said arm means and disposed between said compartmental structures and in cooperative relationship with said lining for skimming a layer of oil adhering to its as said drum means is caused to rotate, the oil skimmed by said blade means gravitating into the hold of said boat structure.

\* \* \* \* \*

UNITED STATES PATENT AND TRADEMARK OFFICE
CERTIFICATE OF CORRECTION

PATENT NO.   : 6,261,451 B1
DATED        : July 17, 2001
INVENTOR(S)  : Louis Genevrino It is certified that error appears in the above-identified patent and that said Letters Patent is hereby corrected as shown below:

<u>Column 9,</u>
Line 4, read "means drum means" as -- said drum means --.

<u>Column 10,</u>
Line 63, read "speaced" as -- spaced --.

Signed and Sealed this

Third Day of September, 2002

Attest:

Attesting Officer

JAMES E. ROGAN
*Director of the United States Patent and Trademark Office*